No. 671,704. Patented Apr. 9, 1901.
E. D. KENDALL.
PROCESS OF TREATING ORES CONTAINING SILVER OR SILVER AND GOLD.
(Application filed May 12, 1898.)
(No Model.)
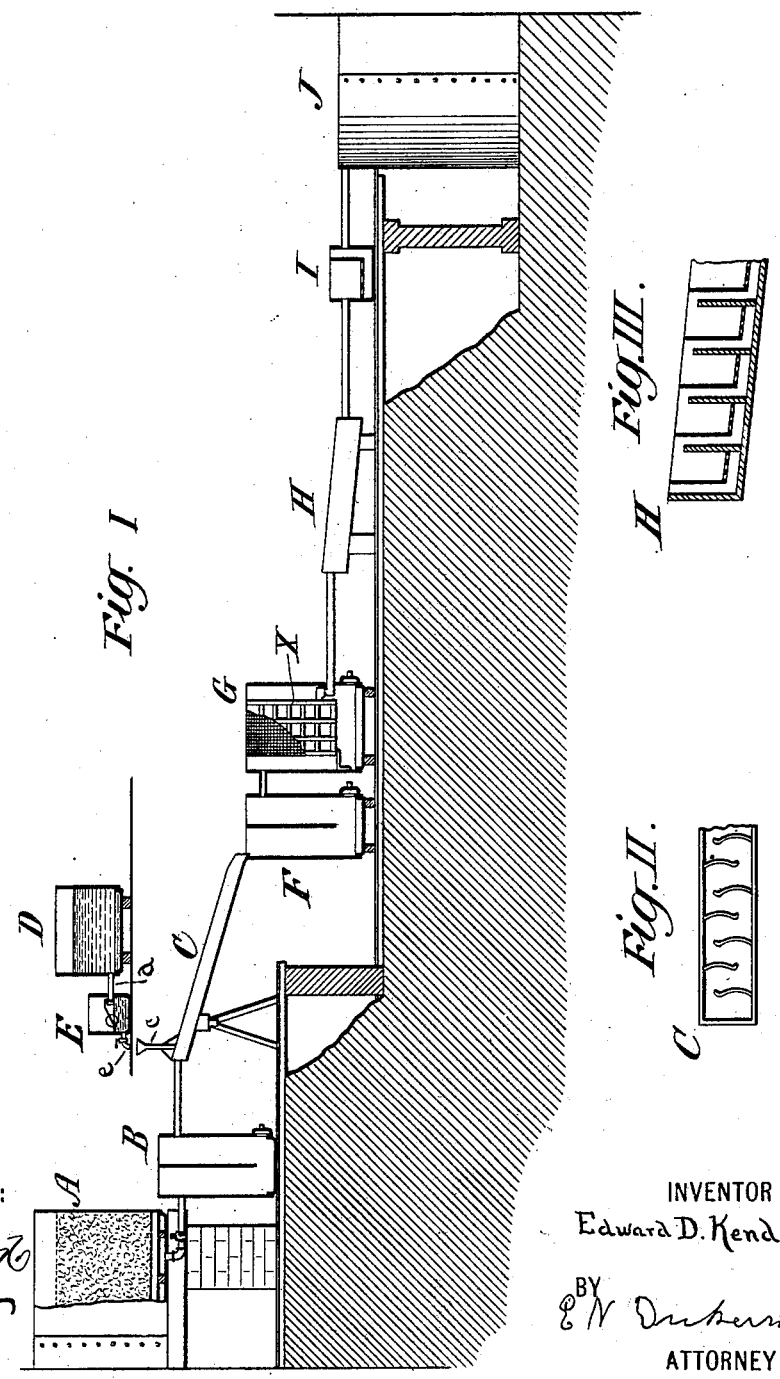
WITNESSES:
O. N. Raymond
H. Coutant
INVENTOR
Edward D. Kendall,
BY
E. N. Dickerson
ATTORNEY

UNITED STATES PATENT OFFICE.

EDWARD D. KENDALL, OF BROOKLYN, NEW YORK, ASSIGNOR TO HIMSELF, AND EDWARD N. DICKERSON, OF NEW YORK, N. Y.

PROCESS OF TREATING ORES CONTAINING SILVER OR SILVER AND GOLD.

SPECIFICATION forming part of Letters Patent No. 671,704, dated April 9, 1901.

Application filed May 12, 1898. Serial No. 680,455. (No specimens.)

*To all whom it may concern:*

Be it known that I, EDWARD D. KENDALL, of the borough of Brooklyn, in the city and State of New York, have invented a new and useful Improvement in Processes of Treating Ores Containing Silver or Silver and Gold and Obtaining the Precious Metals Therefrom, of which the following is a full, true, and exact description, reference being had to the accompanying drawings.

My invention relates to processes for obtaining silver by lixiviation with chemical solutions of ores of silver or of gold ores containing silver; and it consists in the operations hereinafter described.

The apparatus illustrated in the accompanying drawings may be conveniently employed for treating ores in accordance with my processes.
In the said drawings, Figure 1 represents a vertical elevation, mostly in section, of my complete apparatus; Fig. 2, a plan view of the trough C, and Fig. 3 a vertical section through the trough H.
In carrying out my invention I first granulate or pulverize the ore, the character of the ore determining the degree of mechanical reduction. I then convey the comminuted ore into a lixiviation-vat A, which may be of ordinary form. In this vat I subject the ore to the action of a suitable chemical solution containing a thiocyanate or a thiocyanate and a cyanid and capable of dissolving silver or silver and gold from the ore. I preferably use thiocyanates of ammonium or potassium or sodium. I have also used hydrogen thiocyanate and calcium thiocyanate. Potassium cyanid by itself and in aqueous solution is a deadly poison. Its aqueous solution when exposed to the carbon dioxid of the atmosphere evolves hydrocyanic acid, a deadly gas. Potassium thiocyanate is not in this sense a poison, and it does not evolve a gas by exposure to air. It follows that advantage accrues in substituting potassium thiocyanate for potassium cyanid or any portion of the latter. The following experiments will demonstrate this and also the effectiveness of the use of these two chemicals: First, I prepared silver cyanid (AgCN) from silver nitrate (AgNO$_3$) with potassium cyanid (KCN) and washed the precipitated AgCN. On addition of aqueous solution of potassium thiocyanate (KSCN) the silver cyanid immediately dissolved to a colorless solution. Second, I prepared silver thiocyanate (AgSCN) from silver nitrate with potassium thiocyanate (KSCN) and washed the precipitated AgSCN. On addition of aqueous solution of potassium cyanid (KCN) the silver thiocyanate immediately dissolved to a colorless solution. The above experiments, stated in chemical equations, is as follows:

(1)  $AgNO_3 + KCN = KNO_3 + AgCN$
and
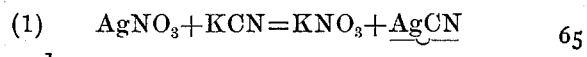
$AgCn + KSCN = \overbrace{AgCn.KSCN},$
or (2)  $AgNO_3 + KSCN = KNO_3 + AgSCN$
and
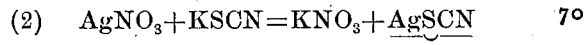
$AgSCN + KCN = \overbrace{AgSCN.KCN.}$ The same experiments are true of gold. I then draw off the lixivium from the ore or allow it to drain off and conduct it into a settling-tank B in order that any fine particles of ore or clayey gangue held in suspension may be deposited. From this settling-tank I conduct the lixivium to the higher end of a narrow trough C, which is supported in an inclined position, so that liquid passing through it shall acquire rapid motion. Within this trough a number of baffle-plates are so arranged that liquid flowing through the trough shall be agitated and whirled by the force of its own current. Sufficiently elevated above the higher end of the trough C is a comparatively small tank D, containing a solution of a sulfid or sulfids, of an alkali metal or metals, or of an alkaline-earth metal or metals, or of ammonium. I specify particularly sulfids of potassium, sodium, and calcium, of which the first-mentioned is preferable. Hydrogen sulfid may be substituted for or used in connection with any of the above-mentioned sulfids without departing from my invention, but not with the same advantage unless the lixivium shall contain free alkaline matter.

Connected with the tank D by the pipe *d* is a smaller tank or water-tight box E, within which is a float attached to a valve or cock, so as to regulate the supply of sulfid solution from the tank D and keep the solution at a constant level in the small tank E. The outlet from the tank E is through a valve or faucet e, which delivers a regulated stream of sulfid solution into a funnel at the top of the pipe c, this pipe conducting the liquid into the higher part of the trough C, where it joins the stream of lixivium flowing through the trough and by the resistance of the baffle-plates is thoroughly mixed with the lixivium. The chemical action of the sulfid solution is to convert the silver contained in the lixivium into insoluble silver sulfid.

The strength of the sulfid solution and the quantity of the same allowed to mingle with the lixivium in the trough C are determined by the quantity of silver contained in a given volume of the lixivium in the settling-tank B, and this is to be occasionally determined by appropriate laboratory tests. Occasionally also a small quantity of the liquid is to be taken from the lower end of the trough C (or from one of the settling-tanks yet to be mentioned) and filtered. One portion of the filtrate is to be tested to determine the quantity of silver, if any is contained in the liquid. Another portion is to be tested to determine sulfid, if any, in order to be able to so adjust the flow of sulfid solution into the trough C as that neither silver nor sulfid shall be appreciable in the last-mentioned tests. These tests may be volumetric with standardized sulfid solution for silver and silver solution for sulfid.

The liquid flowing through the trough C and the silver sulfid held in suspension pass from the lower end of the trough into a settling-tank F, which may be simply a cylindrical receptacle provided (like all of the settling-tanks shown in the drawings) with arrangements for inflow and outflow of liquid and an opening with removable cover near the bottom; but preferably it should also have a partition reaching nearly to its bottom and between the inlet and outlet openings. From the settling-tank F the liquid and some fine suspended silver sulfid pass into the settling and filtering tank G, within which is supported, so as to be removable, an iron frame or lattice-work of wood X, of cylindrical or other suitable form, covered on its outside with any suitable filtering material—for example, cotton-flannel. The liquid passes into the interior of the framework or filter X and thence through a pipe connection, which may be simply a ground socket-joint.

When a sufficient quantity of silver sulfid shall have accumulated in the tanks F and G, they are to be emptied of liquid by siphoning or otherwise and the silver sulfid collected, pressed, dried, and roasted in a suitable small furnace.

When the ore carries little or no gold, the liquid—that is to say, the lixivium or chemical solution—is led from the settling and filtering tank G directly to the chemical-tank I; but when there is sufficient gold to make the recovery thereof profitable the said solution is conducted to a suitable receptacle or receptacles H, containing metallic zinc in comminuted form, where the gold is deposited and may be obtained in the usual way. From the zinc-boxes (or, in the instance first mentioned in this paragraph, directly from the tank G) the chemical solution is conducted into the small chemical-tank I, where, a sufficient quantity of the appropriate chemical or chemicals being added, it is brought as nearly as possible to the same strength and chemical character as when it was first prepared. Passing through the chemical-tank I the solution is led into the sump tank or reservoir J, where, all portions mingling, it acquires uniform strength, and whence it is to be drawn by a suitable pump and forced through pipes to a lixiviation-vat.

What I claim as my invention, and desire to secure by Letters Patent, is—

The herein-described process of treating ores or other bodies for the extraction of precious metals, which consists in treating them with a suitable chemical solution containing a thiocyanate and a cyanid capable of dissolving silver or silver and gold, and in then treating the so-dissolved silver by a suitable sulfid, such as potassium sulfid, and in so regulating the amount of the sulfid to the silver as that they shall substantially equalize each other, in separating the sulfur sulfid, and in returning the thiocyanate and cyanid into subsequent operations for further treatment of the ore, substantially as described.

In testimony whereof I have signed my name to this specification in the presence of two subscribing witnesses.

EDWARD D. KENDALL.

Witnesses:
H. COUTANT,
D. W. MAXON.